United States Patent
Talley et al.

(10) Patent No.: US 8,059,591 B1
(45) Date of Patent: Nov. 15, 2011

(54) DYNAMIC SUPPLEMENTAL-CHANNEL BURST DURATION

(75) Inventors: Ryan S. Talley, Overland Park, KS (US); Andrew M. Wurtenberger, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 580 days.

(21) Appl. No.: 11/674,927

(22) Filed: Feb. 14, 2007

(51) Int. Cl.
*H04W 72/00* (2009.01)

(52) U.S. Cl. ............ 370/329; 455/450; 455/452.2

(58) Field of Classification Search .......... 370/335, 370/329, 338; 455/450–452.2
See application file for complete search history.

(56) References Cited

U.S. PATENT DOCUMENTS

| | | | |
|---|---|---|---|
| 6,850,506 B1* | 2/2005 | Holtzman et al. | 370/335 |
| 6,850,509 B2* | 2/2005 | Lee et al. | 370/336 |
| 7,072,322 B2* | 7/2006 | Holtzman et al. | 370/335 |
| 7,254,121 B2* | 8/2007 | Kim et al. | 370/335 |
| 7,392,055 B2* | 6/2008 | Li et al. | 455/452.2 |
| 7,411,961 B2* | 8/2008 | Rajkotia | 370/395.4 |
| 7,542,440 B2* | 6/2009 | Rajkotia | 370/328 |
| 2003/0125035 A1* | 7/2003 | Khafizov et al. | 455/450 |
| 2004/0141479 A1 | 7/2004 | Cha et al. | |
| 2005/0026642 A1* | 2/2005 | Lee et al. | 455/522 |
| 2005/0107107 A1 | 5/2005 | Shahidi et al. | |
| 2006/0159056 A1* | 7/2006 | Kim | 370/345 |
| 2006/0215600 A1* | 9/2006 | Chen et al. | 370/328 |
| 2007/0121547 A1* | 5/2007 | Huh et al. | 370/329 |

* cited by examiner

*Primary Examiner* — Lester Kincaid
*Assistant Examiner* — Steven Kelley

(57) ABSTRACT

Methods and systems are provided for dynamic supplemental-channel (SCH) burst duration. In an exemplary embodiment, a base station provides a wireless coverage area having a plurality of traffic channels, an SCH, an SCH queue, and an SCH burst duration initially set to a first value. The base station computes $E_c/I_{or}$ for the coverage area, and determines (i) whether the computed $E_c/I_{or}$ is greater than an RF threshold, (ii) whether the number of mobile stations in the SCH queue is less than a queue threshold, and (iii) whether the number of mobile stations having a traffic channel in the coverage area is less than a traffic-channel threshold. The base station determines a second value based at least in part on each of those determinations, and operates with the SCH burst duration set to the second value.

18 Claims, 3 Drawing Sheets

DYNAMIC SUPPLEMENTAL-CHANNEL BURST DURATION

BACKGROUND

1. Technical Field

The present invention relates to wireless communications, and, more particularly, to conducting packet-data communications via wireless networks.

2. Description of Related Art a. CDMA Networks Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1 xRTT (1x) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. When a mobile station is positioned in one of these coverage areas, it can communicate over the RF air interface with the base station, and in turn over one or more circuit-switched and/or packet-switched signaling and/or transport networks to which the base station provides access. The base station and the mobile station conduct these communications over a frequency known as a carrier. Note that base stations may provide service in a coverage area on one carrier, or on more than one.

Communication, including packet-data communication, between the mobile station and the base station is separated into forward-link communication (from the base station to the mobile station) and reverse-link communication (from the mobile station to the base station). And each carrier over which this communication takes place is typically actually a pair of distinct frequencies—one for the forward link and the other for the reverse link. This approach is known as frequency division duplex (FDD).

In a typical CDMA network, using a configuration known as radio configuration 3 (RC3), a base station can, on each carrier in each sector, transmit forward-link data on a maximum of 64 distinct channels at any given time. As a side note, an instance of a carrier in a sector may be referred to herein as a "sector/carrier." Each of these 64 channels corresponds to a unique 64-bit code known as a Walsh code. Of these, typically, 61 channels are available for use as traffic channels (to carry user data), while the other 3 are reserved for administrative channels known as the pilot channel, the paging channel, and the sync channel.

When a base station instructs a mobile station to use a particular traffic channel for a particular communication session, the base station does so by instructing the mobile station to tune to a particular one of those 64-bit Walsh-coded traffic channels. It is over that assigned traffic channel that the base station will transmit forward-link data to the mobile station during the ensuing communication session. Note that, in addition to including the forward-link channel, the traffic channel also includes a corresponding Walsh-coded reverse-link channel, over which the mobile station transmits data to the base station.

These traffic channels may be used for different types of communication, among which are second-generation (2G) voice, 2G data, third-generation (3G) voice, and 3G data. 2G voice is circuit-switched, which involves using an assigned traffic channel for the duration of a call, and is conducted at a data rate of 9.6 kilobits per second (kbps). 2G data is also circuit-switched, somewhat analogous to a dial-up connection over a telephone line between a personal computer and a modem pool, and is conducted at a data rate of 14.4 kbps. Like 2G voice, 3G voice is circuit-switched and is conducted at a data rate of 9.6 kbps. Finally, 3G data is packet-switched, which involves using a traffic channel during actual data transmission and not during so-called "downtime," and, if conducted only over a single 64-bit-Walsh-coded traffic channel (more on this below), is conducted at a data rate of 9.6 kbps.

b. 3G Data: Fundamental and Supplemental Channels

When a mobile station requests a traffic channel to engage in 3G data communication, the 64-bit-Walsh-coded forward-link channel that the base station initially assigns to the mobile station is referred to as a fundamental channel (FCH). It is often the case, however, that the mobile station requests download of more data than can be transmitted to the mobile station over the FCH in an elapsed time that will be satisfactory to the average user. In that case, assuming that all 61 of the base station's 64-bit traffic-channel Walsh codes on that sector/carrier are not occupied by other mobile stations, the base station can request that the mobile station accept data on what is known as a supplemental channel (SCH). As stated, the maximum achievable data rate using the one 64-bit Walsh code corresponding to the FCH is 9.6 kbps; however, higher data rates can be achieved on an SCH.

Like an FCH, an SCH corresponds to a single Walsh code on which the base station instructs the mobile station to receive 3G data. However, the Walsh codes used for an SCH are typically shorter in bit-length than the 64-bit Walsh codes that are used for an FCH. It is by using these shorter-bit-length Walsh codes that higher data rates are achieved on an SCH. However, the availability of these shorter-bit-length Walsh codes depends on how many of the sector's 64-bit, traffic-channel-dedicated Walsh codes are not in use at the time on the carrier in question. The reason for this is that each shorter-bit-length Walsh code corresponds directly to—and essentially occupies—a particular set of the sector/carrier's 64-bit Walsh codes.

Specifically, an SCH can achieve a data rate of 19.2 kbps by using a 32-bit Walsh code, which occupies a particular set of two of the 64-bit Walsh codes on the sector/carrier. The two 64-bit Walsh codes are occupied in the sense that, while the base station is using that 32-bit Walsh code to transmit data to a mobile station on an SCH, the base station is not able to instruct other mobile stations to use either of those two 64-bit Walsh codes.

Similarly, an SCH can achieve 38.4 kbps by using a 16-bit Walsh code, which occupies a particular set of four of the base station's 64-bit Walsh codes on that sector/carrier. As a further example, an SCH can achieve 76.8 kbps by using an 8-bit Walsh code, which occupies a particular set of eight 64-bit Walsh codes. As a final example, the SCH can achieve 153.6 kbps by using a 4-bit Walsh code, which occupies a particular set of sixteen 64-bit Walsh codes.

When a base station has enough data to warrant using an SCH for more than one mobile station on a given sector/carrier, the base station makes use of an entity known as an "RF scheduler" to place those mobile stations in a queue (the "SCH queue"). Each mobile station in the SCH queue is then sequentially given a turn to receive data over the SCH, each turn limited in duration by a base-station parameter known as the "SCH burst duration." Thus, one by one, the mobile stations in the SCH queue receive data over the SCH in bursts that each last a period of time equal to that parameter, a typical value for which is 320 milliseconds, and which is usually set by either the base-station manufacturer or by the owner/operator.

If one burst is not enough to transfer all of the data that the base station has for a given mobile station, the base station will put the mobile station back in the SCH queue and, when its turn comes up again, send another request to the mobile station to again tune to the SCH and receive another burst. The mobile station then accepts this request and receives another burst. This process repeats until the base station has transmitted all of the data to the mobile station. Thus, any periods of time during which the mobile station is waiting in the SCH queue for the base station to request that the mobile station receive another burst on the SCH will reduce the effective data rate at which the mobile station is receiving data.

Note that, in some implementations, mobile stations that are receiving data on the SCH can also receive data on the FCH. In other implementations, mobile stations that are receiving data on the SCH can not also receive data on the FCH. In still other implementations, mobile stations that are receiving data on the SCH may receive overhead data, signaling data, control data, and/or other types of administrative data on the FCH.

c. Forward-Link Transmission-Power Management i. Forward-Link Frame Error Rate (FFER)

In CDMA networks, the transmitting power of a base station on a given sector/carrier is divided among the mobile stations to which the base station is transmitting voice data and/or packet data on traffic channels, as well as among the pilot, paging, and sync channels mentioned above. With respect to mobile stations that engage in 3G voice and 3G data communications, the amount of power that the base station allocates to the transmission to any one mobile station is based on a number of factors, one of which is known as the forward-link frame error rate (FFER). Note that, in CDMA networks, data is transmitted from the base station to the mobile station (and vice versa) in data units that are known as frames.

Some of the frames received by mobile stations contain errors as a result of imperfect transfer from the base station, while some do not. The FFER is a ratio of the number of error-containing frames that the mobile station receives to the total number of frames that the mobile station receives, over a given time period. Note that the FFER calculations often also take into account frames that are not received at all by the mobile station. And, other things being more or less equal, the more power that the base station allocates to a given mobile station, the lower the mobile station's FFER will be. In operation, a mobile station reports its FFER to the base station, and the base station adjusts the power allocated to that mobile station accordingly. This back-and-forth calibration is conducted in an attempt to keep the mobile station's FFER at or below what is deemed to be an acceptable threshold, which typically will be around 2%.

More particularly, the mobile station periodically (e.g. once every 100 or 200 frames) computes its FFER, and reports it to the base station. The base station then adjusts its transmission power accordingly for that mobile station's assigned traffic channel. If the FFER is too high with respect to what is deemed to be an acceptable threshold, the base station increases transmission power in an effort to reduce the FFER. If the FFER is below the threshold, the base station may allocate less power to that mobile station, to have more available for other mobile stations. Again, this process is conducted in an attempt to keep the mobile station's FFER at or just below the acceptable threshold, often referred to as the "FFER target."

Note that different situations may present themselves on a given sector/carrier at different times. For one, the number of mobile stations using FCHs can vary between just a few, such as 10, to a larger number, such as 30, and perhaps approach the upper bound of 61 (assuming RC3). And, as stated, the power that the base station allocates for transmission to these mobile stations can vary. In particular, variables such as terrain, weather, buildings, other mobile stations, other interference, and distance from the base station can affect the FFER that each mobile station reports, and thus the amount of power the base station allocates for each mobile station. Since base stations have a finite amount of power that they can allocate to the mobile stations on a sector/carrier, increasing the transmission power to some or all of those mobile stations (to keep their FFERs low) generally results in the base station being able to serve fewer mobile stations on that sector/carrier. That is, it reduces capacity on the sector/carrier.

ii. The Logarithmic Ratio $E_c/I_{or}$

As explained, in CDMA networks, a given base station has a finite amount of power for transmitting on each sector/carrier on which it is providing service. The base station divides this power among any active traffic channels (over which it is transmitting voice and/or packet data to mobile stations), as well as among the pilot, paging, and sync channels. Periodically, for a given sector/carrier, the base station calculates a ratio of (a) the power it is allocating for transmitting the pilot channel (the "pilot-channel power level") with (b) the power it is allocating for transmitting all (i.e. pilot, paging, sync, and traffic) channels (the "all-channel power level").

This ratio is a base-10 logarithmic one, and is known as "$E_c/I_{or}$." The pilot-channel power level is referred to as "$E_c$"—"energy per chip." The all-channel power level is referred to as "$I_{or}$". $E_c$ and $I_{or}$ can each be expressed in Watts (W), milliwatts (mW), or any other suitable units of measure. Note that $E_c$ and $I_{or}$ are often expressed as base-10 logarithmic ratios themselves, with respect to a reference power level of 1 mW. In that case, $E_c$ and $I_{or}$ would each typically be expressed using the unit "dBm," where "dB" indicates decibels and "m" indicates the reference power level. So, $E_c$ can be expressed as the base-10 logarithmic ratio of the pilot-channel power level (in mW) and 1 mW. And $I_{or}$ can be expressed as the base-10 logarithmic ratio of the all-channel power level (in mW) and 1 mW.

$E_c/I_{or}$ is typically expressed as the base-10 logarithmic ratio of the pilot-channel power level and the all-channel power level, each of which may be measured in Watts. As such, the typical unit of measure for $E_c/I_{or}$ is the decibel (dB). As an example, if a base station were allocating about 2 W (2000 mW) for the pilot channel, $E_c$ would be about 33 dBm, calculated as 10*log((2000 mW)/(1 mW)). And if the base station were allocating a total of about 10 W (10,000 mW) for the pilot, paging, sync, and active traffic channels, $I_{or}$ would be about 40 dBm, calculated as 10*log((10000 mW)/(1 mW)). In this example, $E_c/I_{or}$ would be about −7 dB, calculated as 10*log((2 W)/(10 W)). Note that $E_c/I_{or}$ will always be negative, as long as at least some power is allocated for any one or any combination of the paging, sync, and traffic channels.

As another example, a typical base station may have 16 W of power that it can potentially use for transmitting all channels on a sector/carrier, and may allocate 15% (2.4 W) of that for the pilot channel, 10% (1.6 W) for the paging channel, and 5% (0.8 W) for the sync channel. When that base station is not serving any mobile stations on active traffic channels on the sector/carrier, i.e. when the sector/carrier is "unloaded," $E_c/I_{or}$ would be approximately −3 dB, calculated as 10*log((2.4 W)/(4.8 W)), which, then, would be about as high as $E_c/I_{or}$ gets. Thus, for reference, anything close to −3 dB may be considered relatively high for $E_c/I_{or}$.

And when that same base station is at or near capacity ("fully loaded"), the 15% of its potential sector/carrier power that it is allocating for the pilot channel would shrink from being half of its power output on the sector/carrier (in the unloaded scenario) to, not surprisingly, being about 15% of its power output. This would yield an $E_c/I_{or}$ of approximately −8 dB, calculated as 10*log((2.4 W)/(16 W)), which, then would be about as low as $E_c/I_{or}$ gets. Thus, for reference, anything close to −8 dB may be considered relatively low for $E_c/I_{or}$. In fact, a typical base station may stop accepting new mobile stations on a sector/carrier once $E_c/I_{or}$ degrades to about −8 dB. Thus, $E_c/I_{or}$ can impact sector/carrier capacity as well.

When $E_c/I_{or}$ is relatively high, this could mean a number of things. For example, there could be only a few mobile stations on the sector/carrier, which would lead to a higher ratio of pilot-channel power allocation to total power allocation (with relatively few traffic channels to which to allocate power). Instead or in addition, it could mean that RF conditions are favorable, such that no (or relatively few) mobile stations are experiencing a poor FFER. In that situation, there would be no (or relatively few) mobile stations inducing the base station to increase power on the traffic channels. This would tend to keep the value of $E_c/I_{or}$ relatively high. And other possibilities exist as well.

When $E_c/I_{or}$ is relatively low, this also could mean a number of things. For example, there could be a relatively high number of mobile stations on the sector/carrier, and thus a high number of active traffic channels contributing to a high value of $I_{or}$, and thus a low value of $E_c/I_{or}$. Instead or in addition, it could mean that RF conditions are poor (e.g., due to terrain, weather, interference, etc.); in that case, mobile stations would likely experience poor FFER, and induce the base station to increase power on the traffic channels, which would contribute to a higher $I_{or}$ and thus a lower $E_c/I_{or}$. And other possibilities exist as well.

SUMMARY

Methods and systems are provided for dynamic SCH burst duration. In one aspect, an exemplary embodiment may take the form of a method. In accordance with the method, a base station provides a wireless coverage area having a plurality of traffic channels, an SCH, an SCH queue, an SCH-burst-duration parameter initially set to a first burst-duration value, an RF threshold, a queue threshold, and a traffic-channel threshold. The base station computes an $E_c/I_{or}$ ratio for the wireless coverage area, and makes a first determination as to whether the computed $E_c/I_{or}$ ratio is greater than the RF threshold.

Further in accordance with the method, the base station makes a second determination as to whether a number of mobile stations in the SCH queue is less than the queue threshold. The base station further makes a third determination as to whether a number of mobile stations having a traffic channel in the wireless coverage area is less than the traffic-channel threshold. The base station then determines a second burst-duration value based at least in part on the first determination, at least in part on the second determination, and at least in part on the third determination. Finally, the base station operates with the SCH-burst-duration parameter set to the second burst-duration value.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
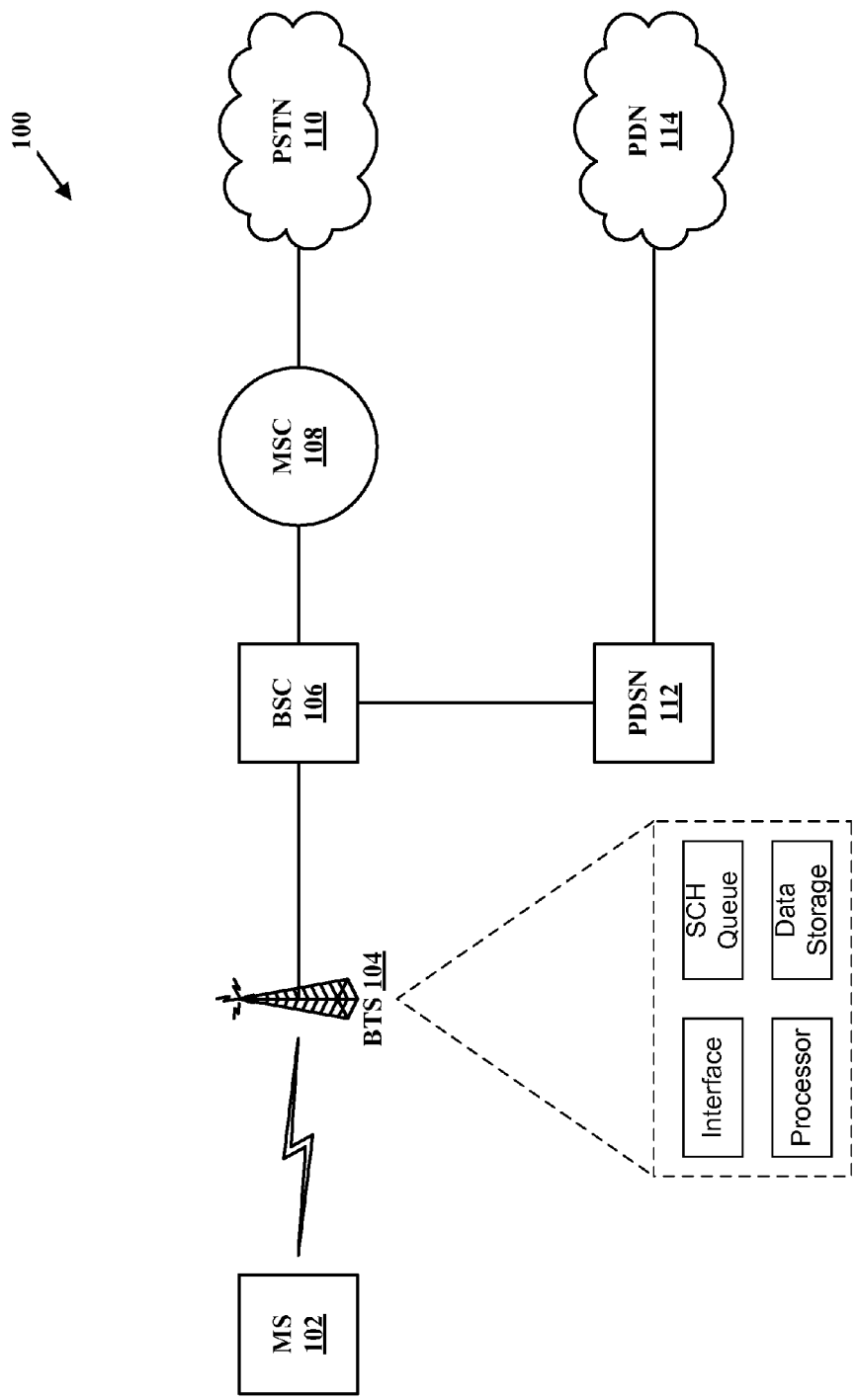
FIG. 1 is a simplified block diagram of a communication system, in accordance with exemplary embodiments.

In accordance with the present invention, for a given sector/carrier, a base station will periodically assess (1) $E_c/I_{or}$, (2) the number of mobile stations waiting in the SCH queue, and (3) the total number of mobile stations to which traffic channels are currently assigned. Based on its assessment of at least these three factors, the base station may dynamically increase the value of its SCH-burst-duration parameter. The base station may instead decrease the value, or perhaps decide to use the same value for the time being.

Thus, a base station may initially operate with the SCH-burst-duration parameter equal to a first value, such as 320 milliseconds. Note that the term "initially" may refer to an initial (i.e. default) configuration for the base station. However, "initially" could also refer to any point during operation of the base station, as the assessment of the factors and the possible adjustment of the burst duration is preferably carried out on a periodic basis, such as once every 30 seconds, once every minute, or may be even more frequently, such as once or more than once per second, depending on the available computational resources, among other factors.

To facilitate assessment of these three factors, the base station will preferably store—or at least have access to—three threshold values, one for each factor. Thus, the base station may store an RF threshold for comparison with a computed $E_c/I_{or}$, a queue threshold for comparison with the number of mobile stations currently waiting in the SCH queue, and a traffic-channel threshold for comparison with the number of mobile stations to which a traffic channel is currently assigned. As sample values, the RF threshold may be −6 dB, the queue threshold may be 3 mobile stations, and the traffic-channel threshold may be 30 mobile stations.

Thus, every 30 seconds, every minute, or whatever the frequency may be, the base station computes $E_c/I_{or}$ for the given sector/carrier. The base station then makes a first determination as to whether the computed $E_c/I_{or}$ is greater than the RF threshold. The base station also makes a second determination as to whether the number of mobile stations in the SCH queue is less than the queue threshold. The base station also makes a third determination as to whether the number of mobile stations having a traffic channel is less than the traffic-channel threshold.

Note that these determinations can be made in any order. Note further that the second and third determinations, as to the number of mobile stations in the queue and the number of mobile stations having assigned traffic channels, need not involve computation, counting, or any other type of involved function. Rather, these values could be maintained on a substantially continuous basis in the software and/or hardware of the base station.

Once these three determinations have been made, the base station determines a second burst-duration value based at least in part on the first determination, at least in part on the second determination, and at least in part on the third determination. As an example, if $E_c/I_{or}$ is greater than the RF threshold, if there are fewer than the queue-threshold number of mobile stations in the SCH queue, and if fewer than the traffic-channel-threshold number of mobile stations have a traffic channel, the base station may choose a new value for the burst duration that is greater than the current value. Thus, with good RF conditions, few mobile stations waiting in the queue, and few mobile stations having traffic channels, this would be a good situation to increase the burst duration and improve the effective data rate for the few mobile stations in the queue.

As another example, if $E_c/I_{or}$ is greater than the RF threshold and there are fewer than the queue-threshold number of mobile stations in the queue, but more than the traffic-channel-threshold number of mobile stations have a traffic channel, then the base station may increase the burst duration, but perhaps by not as much as in the previous example. While the RF conditions and the SCH queue still indicate increasing the burst duration, the high number of mobile stations having traffic channels may make it wise to temper the increase in the burst duration, since, for one, some of the mobile stations that are on the sector/carrier but not in the queue may enter the queue prior to the next time the base station assesses burst duration.

As yet another example, if $E_c/I_{or}$ is less than the RF threshold, if there is more than the queue-threshold number of mobile stations in the queue, and/or if more than the traffic-channel-threshold number of mobile stations have a traffic channel, then the base station may choose a value for the burst duration that is equal to or less than its current value. Thus, the $E_c/I_{or}$, queue, and/or traffic-channel conditions indicate that increasing the burst duration would not be recommended, the base station may decrease or maintain the burst duration.

So, based on the three factors, and perhaps others, the base station may maintain, increase, or decrease the burst-duration value until the next time the base station makes the same assessment and possible adjustment. With respect to how much to increase or decrease, one option would be to double the burst duration when the decision is made to increase, and halve the burst duration when the decision is made to decrease.

Note that, in embodiments that use a test such as the "and/or" test described above for deciding whether to maintain the same burst-duration value or use a lower burst-duration value, explicit computation and/or consideration of only one or two of the factors may be performed, in accordance with the present invention. As an example, if $E_c/I_{or}$ is less than the RF threshold, this may be treated as a sufficient condition to decrease the burst duration.

Finally, once the new value (which may be equal to the previous value) is chosen for the SCH-burst-duration parameter, the base station operates with the SCH-burst-duration parameter set to that new value. This may involve transmitting data to one or more mobile stations over the SCH for a time period equal in length to the newly-determined burst-duration value. And the base station may use this new burst-duration value until the next iteration.

In general, increasing the burst duration would be a positive thing for the mobile stations that directly benefit from the longer data bursts and decreased waiting time, which results in a higher effective data rate. Thus, the general approach of the present invention is to increase the burst duration unless and until there is a reason not to, or a reason to decrease it. With respect to consideration of $E_c/I_{or}$, generally the mindset is that, if that value is high, then $E_c/I_{or}$ is not an obstacle to increasing burst duration. There would not be much interference in that sector at that time, and so using longer data bursts would not make the overall level of interference rise to an unacceptable level; thus, newly-arriving mobile stations would not be deterred from connecting to that base station, as they would if $E_c/I_{or}$ became too degraded.

If $E_c/I_{or}$ is low, however, this means that there is already a relatively high level of interference in the sector on that carrier, and it would be unwise to use a longer burst duration, which would degrade the ratio even further, and, among other negative consequences, make it less likely that mobile stations arriving at the sector would consider that sector/carrier to be an attractive option. So when $E_c/I_{or}$ is low, it would make sense to maintain or shorten the burst duration, to reduce the amount of time that the SCH is degrading the ratio.

With respect to the number of mobile stations in the queue, if that number is low, this variable does not present an obstacle to increasing the burst duration. This is because increasing the burst duration would not result in much of an aggregate effect in the form of increased waiting time, with only a few mobile stations in the queue. If that number is high, however, then it would be undesirable to increase the burst duration and make those mobile stations that are already waiting wait even longer. In fact, when the queue has a large number of mobile stations, it would tend to make sense to maintain or shorten the burst duration, so that the mobile stations could more frequently be given turns to receive data on the SCH.

With respect to the number of mobile stations having an assigned traffic channel, if that number is low, that means that there are a higher number of 64-bit Walsh codes available for occupation by shorter-length Walsh codes used for the SCH. Also, there is less of a chance that the queue will fill up with other mobile stations in the near future. However, if there are a high number of assigned traffic-channels, this makes the 64-bit Walsh codes a scarcer resource that would be unwise to occupy with longer SCH transmissions. Also, there is a better chance that more mobile stations will enter the queue in the near future, thus making it unwise to increase the burst duration. Note that, preferably, the traffic-channel threshold would be set high enough to rarely present an obstacle to increasing the burst duration.

As an overall matter, then, the present invention should increase the effective data rate—allowing higher data throughput—during times of favorable RF conditions and light loading. During these times, the amount of time that mobile stations spend waiting in the queue will be reduced. In the prior art, the SCH-burst-duration is fixed and not responsive to the factors that are taken into account in accordance with the present invention. Thus, in the prior art, the base station often has to wastefully repeatedly request and re-request that mobile stations accept data bursts on the SCH, even if RF conditions are favorable and the sector/carrier is relatively lightly loaded. This is inefficient. During these times, there is no reason to be so rigorous about the burst duration. The present invention provides a non-rigorous, dynamic improvement.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

BTS 104 may be any network element arranged to carry out the BTS functions described herein. As such, BTS 104 may include a wireless-communication interface, an SCH queue, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

3. Exemplary Operation

Figure 2:
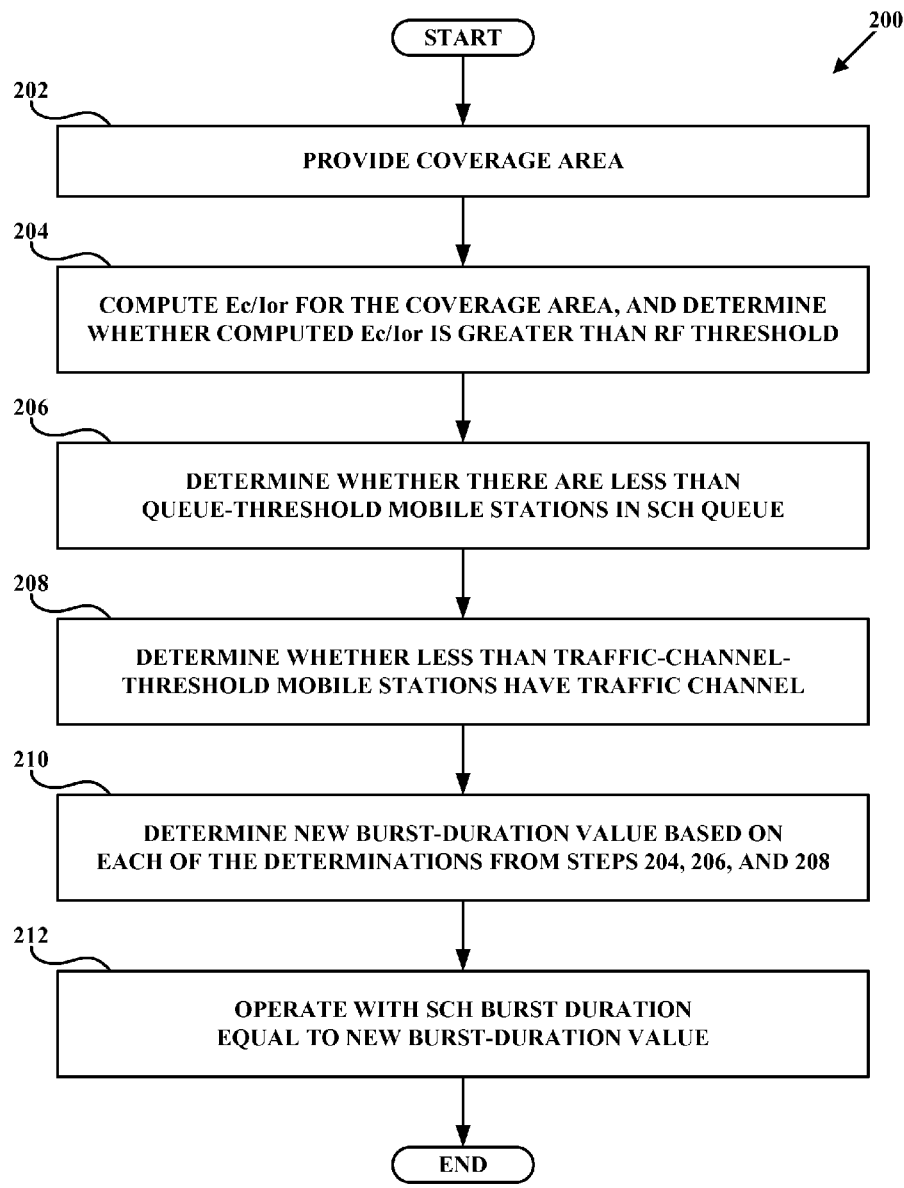
FIG. 2 is a flowchart of a method, in accordance with exemplary embodiments.

FIG. 2 depicts a flowchart of a method, in accordance with exemplary embodiments. As shown in FIG. 2, method 200 begins at step 202, when BTS 104 provides a wireless coverage area having a plurality of traffic channels, an SCH, an SCH queue, an SCH-burst-duration parameter initially set to a first burst-duration value, an RF threshold, a queue threshold, and a traffic-channel threshold.

At step 204, BTS 104 computes an $E_c/I_{or}$ ratio for the wireless coverage area, and makes a first determination as to whether the computed $E_c/I_{or}$ ratio is greater than the RF threshold. At step 206, BTS 104 makes a second determination as to whether a number of mobile stations in the SCH queue is less than the queue threshold. At step 208, BTS 104 makes a third determination as to whether a number of mobile stations having a traffic channel in the wireless coverage area is less than the traffic-channel threshold.

At step 210, BTS 104 determines a second burst-duration value based at least in part on the first determination, at least in part on the second determination, and at least in part on the third determination. At step 212, BTS 104 operates with the SCH-burst-duration parameter set to the second burst-duration value. These steps are explained in the following subsections.

Note that method 200 is described herein as being carried out by BTS 104. This, however, is not required. In general, method 200 can be carried out by any one or any combination of BTS 104, BSC 106, MSC 108, PDSN 110, a device known as a radio network controller, a device known as an access node, a computer, a server, and another network entity. Note as well that, as described herein, method 200 is preferably carried out on a periodic basis, such as once every 30 seconds, once every minute, or once per some other time interval, so as to dynamically adjust the SCH burst duration for a given sector/carrier to changing conditions.

i. Provide Wireless Coverage Area

At step 202, BTS 104 provides a wireless coverage area having a plurality of traffic channels, an SCH, an SCH queue, an SCH-burst-duration parameter initially set to a first burst-duration value, an RF threshold, a queue threshold, and a traffic-channel threshold. As examples, the wireless coverage area could be a cell or a sector, and a sector will be used for illustration in the balance of the description of FIG. 2. And, also as an example, the first burst-duration value could be 320 milliseconds.

ii. Compute $E_c/I_{or}$ and Compare with RF Threshold

At step 204, BTS 104 computes $E_c/I_{or}$ for the sector/carrier, and determines whether the computed $E_c/I_{or}$ is greater than the RF threshold, which BTS 104 may have stored in data storage. Computation of is $E_c/I_{or}$ known to those in the art, and is described herein, and thus is not described in detail here. In general, BTS 104 would compute use its pilot-channel power level (P) on the sector/carrier in question and its all-channel power level (A) on the sector/carrier, and compute $E_c/I_{or}$ as $10*\log(P/A)$, where the logarithm is base 10. As an exemplary RF-threshold value, −6 dB could be used.

iii. Compare Number of Mobile Stations in SCH Queue with SCH-Queue Threshold

At step 206, BTS 104 determines whether the number of mobile stations in the SCH queue for the sector/carrier is less than the SCH-queue threshold. Thus, BTS 104 may be sequentially transmitting data to a number of mobile stations on the sector/carrier using the SCH. At the time of carrying out step 206, BTS 104 may determine whether the number of mobile stations in the SCH queue is greater than or less than the SCH-queue threshold, which, like the other thresholds discussed herein, BTS 104 may have stored in data storage. As one example, the SCH-queue threshold may be set to 3 mobile stations.

Note that, with this step, as with all comparisons of a measured, calculated, and/or stored (i.e. actual) value with a threshold discussed herein, the threshold could be set to a number with which the actual value would not be equal. For example, the SCH-queue threshold could be set to 3.5 mobile stations, such that the actual value would always be either less than or greater than the threshold, but never equal. Alternatively, or for one or more of the other thresholds, even if the threshold is set to a value that can be equal to the actual value, the comparison could be implemented such that "less than" encompasses "less than or equal to," or such that "greater than" encompasses "greater than or equal to." Such strategies for steering the outcome of value-threshold comparisons and for addressing the complete range of actual-value possibilities are within those of skill in the art.

iv. Compare Number of Mobile Stations Having Traffic Channels with Traffic-Channel Threshold At step 208, BTS 104 determines whether the number of mobile stations having a traffic channel on the relevant sector/carrier is less than the traffic-channel threshold. Note that the traffic-channel threshold may, like the other relevant thresholds, be stored by BTS 104 in data storage. In general, a given mobile station may be considered to have a traffic channel when that given mobile station has a 64-bit Walsh code assigned to it by BTS 104, for use as a fundamental channel (FCH) in conducting voice and/or packet-data communication. As an example, the traffic-channel threshold could be 30, and would preferably be set high enough to rarely present an obstacle to increasing the SCH-burst duration in accordance with exemplary embodiments.

v. Determine New Burst Duration Based on $E_c/I_{or}$ SCH-Queue, and Traffic-Channel Determinations At step 210, BTS 104 determines a second burst-duration value based at least in part on the $E_c/I_{or}$ determination made in step 204, at least in part on the SCH-queue determination made in step 206, and at least in part on the traffic-channel determination made in step 208. As examples, for carrying out step 210, −6 dB could be used as the RF threshold, 3.5 mobile stations could be used as the SCH-queue threshold, and 30.5 mobile stations could be used as the traffic-channel threshold. Furthermore, reference will be made to FIG. 3, which depicts several scenarios that may occur during operation of the present invention.

Figure 3:
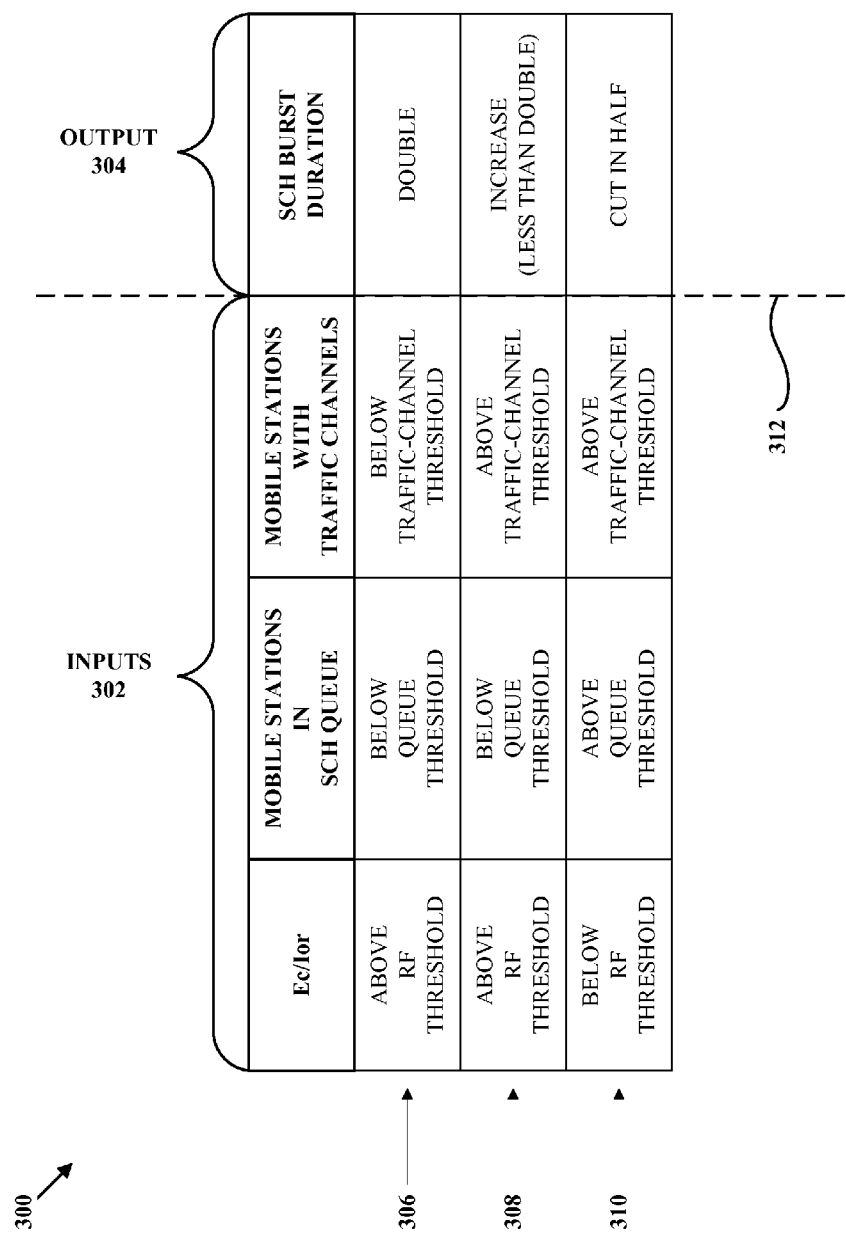
FIG. 3 is a table showing several exemplary scenarios, in accordance with exemplary embodiments.

In particular, FIG. 3 depicts three exemplary scenarios 306, 308, and 310. Each scenario 306-310 is depicted as having three inputs (i.e. preliminary determinations) 302 (to the left of the dashed line 312) and one output (i.e. decision) 304 (to the right of the dashed line 312). More specifically, each scenario 306-310 has an input related to whether $E_c/I_{or}$ is above or below the RF threshold of −6 dB, an input related to whether the number of mobile stations in the SCH queue is above or below the SCH-queue threshold of 3.5 mobile stations, and an input related to whether the number of mobile stations having traffic channels on the sector/carrier in question is above or below the traffic-channel threshold of 30.5 mobile stations.

In scenario 306, BTS 104 has (a) determined in step 204 that the computed $E_c/I_{or}$ is above the RF threshold, (b) determined in step 206 that the number of mobile stations in the SCH queue is less than the SCH-queue threshold, and (c) determined that the number of mobile stations having a traffic channel is less than the traffic-channel threshold. Based on this combination of determinations, BTS 104 doubles the SCH-burst-duration parameter for the sector/carrier in question. Note that doubling is just an example of a way to choose a new burst duration that is greater than the current value. As an example, scenario 306 may involve doubling the SCH-burst duration from 320 milliseconds to 640 milliseconds.

In scenario 308, BTS 104 has (a) determined in step 204 that the computed $E_c/I_{or}$ is greater than the RF threshold and (b) determined in step 206 that the number of mobile stations in the SCH queue is less than the SCH-queue threshold, but also (c) determined in step 208 that the number of mobile stations having a traffic channel is greater than the traffic-channel threshold. Based on this combination of determinations, BTS 104 increases the burst duration, but not so much so as to double the previous value. In this scenario, both $E_c/I_{or}$ and the queue indicate increasing the burst duration, but there are a higher number of mobile stations having traffic channels than in scenario 306. In that situation, it may make sense to temper the increase in burst duration, for at least the reason that the SCH queue may soon have a higher number of mobile stations. And if that happened, a long burst duration could result in too much aggregate waiting time in the queue, among other problems.

In scenario 310, BTS 104 has (a) determined in step 204 that the computed $E_c/I_{or}$ is less than the RF threshold, (b) determined in step 206 that the number of mobile stations in the SCH queue is greater than the SCH-queue threshold, and (c) determined in step 208 that the number of mobile stations having a traffic channel is greater than the traffic-channel threshold. Based on this combination of determinations, BTS 104 halves the SCH-burst-duration parameter for the sector/carrier in question. Note that halving is just an example of a way to choose a new burst duration that is less than the current value. As an example, scenario 310 may involve halving the SCH-burst duration from 320 milliseconds to 160 milliseconds.

Note that another option for scenario 310 would be to choose the new burst duration to be equal to the previous value. Furthermore, it may be the case that making any one of the three determinations described in connection with scenario 310 would be sufficient to decide to maintain or decrease the SCH-burst duration for the sector/carrier in question. For example, it could be the case that determining that $E_c/I_{or}$ is below the RF threshold would, in all cases, result in decreasing the burst duration. This is not to say that, in those cases, that the SCH-queue and traffic-channel conditions are not being considered, only that the same outcome (i.e. output 304) could attach to all of their possible combinations of values (i.e. both above their respective thresholds, both below their respective thresholds, etc.). But the structure of considering all three inputs is in place, such that the implementer could adjust this logic to particular situations as needed, without departing from the scope and spirit of the present invention.

vI. Operate with the SCH Burst Duration Set to New Value

At step 212, BTS 104 operates with the SCH-burst-duration parameter set to the new burst-duration value, which was determined in step 210. Carrying out step 212 may involve BTS 104 transmitting data to at least one mobile station, perhaps including mobile station 102, over the SCH for a time period equal in length to the burst-duration value chosen in step 210. And since method 200 is preferably carried out repeatedly on a periodic basis, this new value would serve as the first value for the next iteration, and the SCH-burst duration would be dynamically adjusted to changing $E_c/I_{or}$, SCH-queue, and traffic-channel conditions over time.

4. Conclusion

Various exemplary embodiments have been described above. Those skilled in the art will understand, however, that changes and modifications may be made to those examples without departing from the scope of the claims.

What is claimed is:

1. A method comprising:
   providing a wireless coverage area having a plurality of traffic channels, a supplemental channel (SCH), an SCH queue, an SCH-burst-duration parameter initially set to a first burst-duration value, an RF threshold, a queue threshold, and a traffic-channel threshold, wherein the SCH-burst-duration parameter used for all mobile stations in the coverage area (1) reflects a maximum amount of time during which data could be transmitted during a single burst of the SCH and (2) corresponds to how much time lapses between the respective starts of successive bursts of the SCH;
   computing an $E_c/I_{or}$ ratio for the wireless coverage area, and making a first determination as to whether the computed $E_c/I_{or}$ ratio is greater than the RF threshold;
   making a second determination as to whether a number of mobile stations in the SCH queue is less than the queue threshold;
   making a third determination as to whether a number of mobile stations having a traffic channel in the wireless coverage area is less than the traffic-channel threshold;
   determining a second burst-duration value, the second burst-duration value being different from the first burst-duration value, based at least in part on the first determination, at least in part on the second determination, and at least in part on the third determination; and
   operating with the SCH-burst-duration parameter set to the second burst-duration value.

2. The method of claim 1, carried out by at least one of a code division multiple access (CDMA) base station, a base transceiver station (BTS), a base station controller (BSC), a radio network controller (RNC), and an access node (AN).

3. The method of claim 1, wherein the wireless coverage area comprises at least one of a cell and a sector.

4. The method of claim 1, wherein the first burst-duration value is 320 milliseconds.

5. The method of claim 1, wherein determining the second burst-duration value comprises:
   if (a) the first determination is that the computed $E_c/I_{or}$ ratio is greater than the RF threshold, (b) the second determination is that the number of mobile stations in the SCH queue is less than the queue threshold, and (c) the third determination is that the number of mobile stations having a traffic channel is less than the traffic-channel threshold, then choosing the second burst-duration value to be greater than the first burst-duration value.

6. The method of claim 1, wherein determining the second burst-duration value comprises:
   if (a) the first determination is that the computed $E_c/I_{or}$ ratio is greater than the RF threshold, (b) the second determination is that the number of mobile stations in the SCH queue is less than the queue threshold, and (c) the third determination is that the number of mobile stations having a traffic channel is not less than the traffic-channel threshold, then choosing the second burst-duration value to be greater than the first burst-duration value.

7. The method of claim 1, wherein determining the second burst-duration value comprises:
   if (a) the first determination is that the computed EA, ratio is not greater than the RF threshold, (b) the second determination is that the number of mobile stations in the SCH queue is not less than the queue threshold, and/or (c) the third determination is that the number of mobile stations having a traffic channel is not less than the traffic-channel threshold, then choosing the second burst-duration value to be less than the first burst-duration value.

8. The method of claim 1, wherein the second burst-duration value is greater than the first burst-duration value.

9. The method of claim 8, wherein the second burst-duration value is equal to twice the first burst-duration value.

10. The method of claim 1, wherein the second burst-duration value is less than the first burst-duration value.

11. The method of claim 10, wherein the second burst-duration value is equal to half the first burst-duration value.

12. The method of claim 1, carried out on a periodic basis.

13. The method of claim 1, wherein operating with the SCH-burst-duration parameter set to the second burst-duration value comprises transmitting data to a mobile station over the SCH for a time period equal in length to the second burst-duration value.

14. A base station comprising:
a wireless-communication interface for providing a wireless coverage area having (i) a plurality of traffic channels and (ii) a supplemental channel (SCH);
an SCH queue; a processor; and
data storage comprising an SCH-burst-duration parameter initially set to a first burst-duration value, wherein the SCH-burst-duration parameter used for all mobile stations in the coverage area (1) reflects a maximum amount of time during which data could be transmitted during a single burst of the SCH and (2) corresponds to how much time lapses between the respective starts of successive bursts of the SCH, an RF threshold, a queue threshold, and a traffic-channel threshold, the data storage further comprising instructions executable by the processor to:
compute an $E_c/I_{or}$ ratio for the wireless coverage area, and make a first determination as to whether the computed $E_c/I_{or}$ ratio is greater than the RF threshold;
make a second determination as to whether a number of mobile stations in the SCH queue is less than the queue threshold;
make a third determination as to whether a number of mobile stations having a traffic channel in the wireless coverage area is less than the traffic-channel threshold;
determine a second burst-duration value, the second burst-duration value being different from the first burst-duration value, based at least in part on the first determination, at least in part on the second determination, and at least in part on the third determination; and
operate with the SCH-burst-duration parameter set to the second burst-duration value.

15. The base station of claim 14, wherein the instructions to determine the second burst-duration value comprise instructions to:
if (a) the first determination is that the computed $E_c/I_{or}$ ratio is greater than the RF threshold, (b) the second determination is that the number of mobile stations in the SCH queue is less than the queue threshold, and (c) the third determination is that the number of mobile stations having a traffic channel is less than the traffic-channel threshold, then choose the second burst-duration value to be greater than the first burst-duration value.

16. The base station of claim 14, wherein the instructions to determine the second burst-duration value comprise instructions to:
if (a) the first determination is that the computed $E_c/I_{or}$ ratio is greater than the RF threshold, (b) the second determination is that the number of mobile stations in the SCH queue is less than the queue threshold, and (c) the third determination is that the number of mobile stations having a traffic channel is not less than the traffic-channel threshold, then choose the second burst-duration value to be greater than the first burst-duration value.

17. The base station of claim 14, wherein the instructions to determine the second burst-duration value comprise instructions to:
if (a) the first determination is that the computed EA, ratio is not greater than the RF threshold, (b) the second determination is that the number of mobile stations in the SCH queue is not less than the queue threshold, and/or (c) the third determination is that the number of mobile stations having a traffic channel is not less than the traffic-channel threshold, then choose the second burst-duration value to be less than the first burst-duration value.

18. The base station of claim 14, wherein the instructions to operate with the SCH-burst-duration parameter set to the second burst-duration value comprise instructions to transmit data to a mobile station over the SCH for a time period equal in length to the second burst-duration value.

* * * * *